United States Patent
Kawaguchi et al.

(10) Patent No.: US 8,266,899 B2
(45) Date of Patent: Sep. 18, 2012

(54) EXHAUST PURIFICATION APPARATUS FOR INTERNAL COMBUSTION ENGINE

(75) Inventors: Bungo Kawaguchi, Susono (JP); Shinji Kamoshita, Gotenba (JP); Tomihisa Oda, Numazu (JP); Nobumoto Ohashi, Susono (JP); Satoshi Kobayakawa, Susono (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 310 days.

(21) Appl. No.: 12/733,427

(22) PCT Filed: Jan. 13, 2009

(86) PCT No.: PCT/JP2009/050329
§ 371 (c)(1),
(2), (4) Date: Mar. 1, 2010

(87) PCT Pub. No.: WO2010/082306
PCT Pub. Date: Jul. 22, 2010

(65) Prior Publication Data
US 2011/0083427 A1    Apr. 14, 2011

(51) Int. Cl.
*F01N 3/00* (2006.01)
(52) U.S. Cl. .............. 60/295; 60/285; 60/286; 60/300
(58) Field of Classification Search ............ 60/295
See application file for complete search history.

(56) References Cited

U.S. PATENT DOCUMENTS

| | | | |
|---|---|---|---|
| 2005/0000209 A1* | 1/2005 | Takahashi et al. | 60/286 |
| 2006/0179821 A1* | 8/2006 | Zhan et al. | 60/286 |
| 2007/0079602 A1* | 4/2007 | Hu et al. | 60/286 |
| 2007/0089403 A1* | 4/2007 | Pfeifer et al. | 60/286 |
| 2007/0137184 A1* | 6/2007 | Patchett et al. | 60/286 |
| 2007/0175208 A1* | 8/2007 | Bandl-Konrad et al. | 60/286 |
| 2008/0141663 A1 | 6/2008 | Ono | |
| 2008/0163609 A1 | 7/2008 | Satou et al. | |

(Continued)

FOREIGN PATENT DOCUMENTS

JP    A-2004-108344    4/2004

(Continued)

OTHER PUBLICATIONS

International Search Report dated Jun. 2, 2009 in corresponding International Application No. PCT/JP2009/050329 (with translation).

(Continued)

*Primary Examiner* — Thomas E. Denion
*Assistant Examiner* — Jason Shanske
(74) *Attorney, Agent, or Firm* — Oliff & Berridge, PLC

(57) ABSTRACT

The present invention provides an internal combustion engine exhaust purification apparatus includes a filter configured to collect particulate matter contained in exhaust gas, a selective catalytic reduction converter provided downstream of the filter to reduce nitrogen oxide contained, an oxidation catalyst converter with an adsorption function provided upstream of the converter to temporarily adsorb the nitrogen oxide contained in the exhaust gas, a burner configured to increase the temperature of the exhaust gas flowing into the filter, the selective catalytic reduction converter, and the oxidation catalyst converter to set the temperature of the filter to at least a predetermined recovery temperature, thus recovering the filter, and an ECU configured to inhibit the burner from being started when the burner is otherwise to be started but if the selective catalytic reduction converter has not been activated.

7 Claims, 3 Drawing Sheets

U.S. PATENT DOCUMENTS

2010/0111774 A1* 5/2010 Toshioka et al. .............. 422/105
2010/0192547 A1* 8/2010 Yabe et al. ...................... 60/286

FOREIGN PATENT DOCUMENTS

| JP | A-2005-207281 | 8/2005 |
| JP | A-2006-233833 | 9/2006 |
| JP | A-2006-342735 | 12/2006 |
| JP | A-2008-106664 | 5/2008 |
| JP | A-2008-255905 | 10/2008 |
| JP | A-2008-261253 | 10/2008 |
| JP | A-2008-280949 | 11/2008 |
| JP | A-2009-013931 | 1/2009 |

OTHER PUBLICATIONS

Jan. 20, 2012 Japanese Office Action issued in Japanese Patent Application No. 2009-553851 (with translation).

* cited by examiner

EXHAUST PURIFICATION APPARATUS FOR INTERNAL COMBUSTION ENGINE

TECHNICAL FIELD

The present invention relates to an exhaust purification apparatus for an internal combustion engine.

BACKGROUND ART

Many exhaust purification systems have been proposed in order to allow nitrogen oxide (NOx) contained in exhaust gas to be purified. For example, an exhaust purification system Patent Document 1 comprises a burner system configured to increase the temperature of exhaust gas, a filter configured to collect particulate matter (PM) contained in the exhaust gas, an NOx adsorption material configured to temporarily adsorb nitrogen oxide contained in the exhaust gas, and a combustion device configured to combust the nitrogen oxide desorbed from the NOx adsorption material; the burner system, the filter, the NOx adsorption material, and the combustion device are all provided in an exhaust passage. In this exhaust purification apparatus, a filter with PM accumulated therein is recovered by using the burner system to increase the temperature of the filter to combust and remove the PM. At this time, the temperature of the NOx adsorption material also increases. Thus, the NOx adsorbed on the NOx adsorption material is desorbed. The desorbed NOx is reduced and removed by the combustion device.

Patent Document 1: Japanese Patent Laid-Open No. 2005-207281

DISCLOSURE OF THE INVENTION

In the exhaust purification apparatus disclosed in Patent Document 1, the combustion device consumes a large amount of fuel in order to reduce and remove NOx. To reduce fuel consumption required to purify NOx, instead of the combustion device, an NOx catalyst may be installed in the exhaust passage. The NOx catalyst may be, for example, a selective catalytic reduction that uses urea as a reducing agent.

However, when the filter is recovered, if the NOx catalyst that has just been cold-started has not reached an activation temperature yet, the NOx desorbed as a result of an increase in the temperature of the NOx adsorption material may pass through the NOx catalyst and be emitted to the exterior.

The present invention has been made in view of the above-described problems. An object of the present invention is to provide an exhaust purification apparatus for an internal combustion engine comprising a filter configured to collect particulate matter in exhaust gas, an adsorption material configured to adsorb nitrogen oxide in the exhaust gas, and a nitrogen oxide selective catalytic reduction configured to reduce the nitrogen oxide in the exhaust gas, the filter, the adsorption material, and the nitrogen oxide selective catalytic reduction being separately arranged in an exhaust gas passage, wherein the exhaust purification apparatus allows a reduction in emission of the nitrogen oxide to the exterior during cold start or the like.

An exhaust purification apparatus for an internal combustion engine according to the present invention is characterized by comprising a filter provided in an exhaust passage in the internal combustion engine to collect particulate matter contained in exhaust gas, a selective catalytic reduction converter provided downstream of the filter in the exhaust passage to reduce nitrogen oxide contained in the exhaust gas, adsorption means provided upstream of the selective catalytic reduction converter in the exhaust passage to temporarily adsorb the nitrogen oxide contained in the exhaust gas and which is to be reduced by the selective catalytic reduction converter, recovery processing means for recovering the filter by boosting temperature of the exhaust gas flowing into the filter, the selective catalytic reduction converter and the adsorption means so as to heat the filter over at least a predetermined recovery temperature, and control means configured to inhibit the recovery processing means from being started if the selective catalytic reduction converter has not been activated even when amount of particulate matter accumulated in the filter exceeds a predetermined value and thus the recovery processing means is to be started.

Preferably, the recovery processing means may be provided upstream of the filter in the exhaust passage and comprise an oxidation catalyst converter configured to increase the temperature of the exhaust gas by oxidizing unburned fuel.

More preferably, the recovery processing means may comprise a burner provided upstream of the oxidation catalyst converter in the exhaust passage.

The adsorption means may be formed integrally with the oxidation catalyst converter.

The control means may determine whether or not to inhibit the recovery process from being started based on a condition of the selective catalytic reduction converter and an adsorption condition in which the adsorption means adsorbs the nitrogen oxide.

In the above-described configuration, while the recovery process is inhibited from being started, if the amount by which particulate matter is accumulated in the filter reaches a second predetermined amount exceeding the first predetermined amount, the inhibition of starting of the recovery process is cancelled.

The present invention provides an exhaust purification apparatus for an internal combustion engine which allows nitrogen oxide to be more appropriately purified during cold start or the like.

BEST MODE FOR CARRYING OUT THE INVENTION

A preferred embodiment of the present invention will be described below in detail with reference to the drawings.

Figure 1:
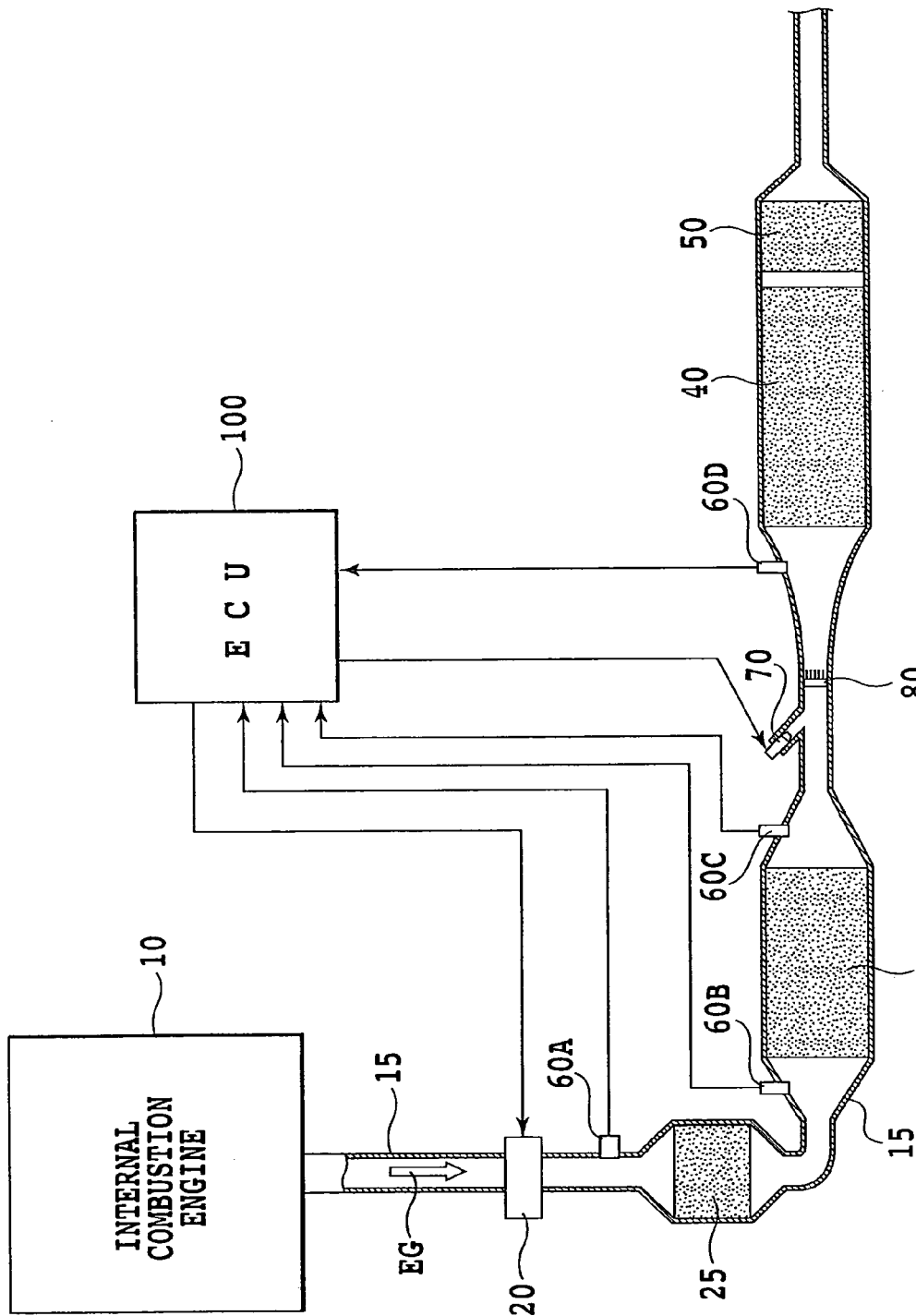
FIG. 1 is a diagram showing the configuration of an exhaust purification apparatus for an internal combustion engine according to an embodiment of the present invention.

FIG. 1 is a diagram showing the configuration of an exhaust purification apparatus for an internal combustion engine according to an embodiment of the present invention. In FIG. 1, an internal combustion engine 10 is a diesel engine. An exhaust passage 15 in the internal combustion engine 10 includes a burner 20 serving as recovery processing means, an oxidation catalyst converter 25 with an adsorption function which serves as an adsorption material and an oxidation catalyst converter, a DPF (Diesel Particulate Filter) 30 serving as a filter, a selective catalytic reduction converter 40, and an oxidation catalyst converter 50; in the exhaust passage 15, the burner 20, the oxidation catalyst converter 25, the DPF 30, the selective catalytic reduction converter 40, and the oxidation catalyst converter 50 are arranged in this order from the upstream side.

Furthermore, in the exhaust passage 15, an exhaust temperature sensor 60A is provided between the burner 20 and the oxidation catalyst converter 25 with the adsorption function. An exhaust temperature sensor 60B is provided between the oxidation catalyst converter 25 with the adsorption function and the DPF 30. Between the DPF 30 and the selective catalytic reduction converter 40, an exhaust temperature sensor 60c is provided on the upstream side, and an exhaust temperature sensor 60D is provided on the downstream side. Outputs from the exhaust temperature sensors 60A to 60D are input to an electronic control device (ECU) 100.

Moreover, a urea aqueous solution addition valve 70 and an addition valve downstream mixer 80 are provided between the DPF 30 and the selective catalytic reduction converter 40; the urea aqueous solution addition valve 70 is configured to add a urea aqueous solution to the exhaust passage 15, and the addition valve downstream mixer 80 is provided downstream of the urea aqueous solution addition valve 70 to mix exhaust gas EG and a urea aqueous solution. The urea aqueous solution addition valve 70 is controlled by the ECU 100.

The burner 20 comprises, for example, a fuel injection valve configured to inject fuel toward the exhaust passage 15, an air inlet configured to feed air toward the exhaust passage 15, and a spark plug configured to ignite fuel injected via the fuel injection valve and mixed with air. The burner 20 is controllably started and stopped by the ECU 100. The burner 20 is started as required to combust fuel to increase the temperature of the exhaust gas EG. At the same time, the unburned fuel is supplied to the exhaust passage 15. The burner 20 allows gas obtained by completely combusting fuel to be fed into the exhaust passage 15 and also allows a mixture of combustion gas and unburned fuel to be fed into the exhaust gas 15.

The oxidation catalyst converter 25 with the adsorption function includes both an oxidation catalyst configured to oxidize unburned fuel or the like in order to increase the temperature of the exhaust gas EG fed to the succeeding DPF 30 and the like, and an NOx adsorbing function to allow nitrogen oxide (NOx) to be temporarily adsorbed and held. Specifically, when the temperature of the oxidation catalyst converter 25 with the adsorption function is increased to at least 500° C., the oxidation catalyst converter 25 is activated to fulfill the oxidation function thereof. On the other hand, at relatively low temperature at which the oxidation function is not activated, the oxidation catalyst converter 25 with the adsorption function temporarily adsorbs and holds NOx. However, a certain amount of increase in temperature causes the adsorbed NOx to desorb. That is, the oxidation catalyst converter 25 with the adsorption function, including both the oxidation catalyst and the NOx adsorption function, allows NOx to be quickly desorbed as a result of a rapid increase in temperature. In the oxidation catalyst converter 25 with the adsorption function, for example, the oxidation catalyst comprises an adsorption material composed of a material such as zeolite and carried on a well-known oxidation catalyst structure. The structure of the oxidation catalyst converter 25 with the adsorption function is not particularly limited provided that the converter 25 provides both the oxidation function and the NOx adsorbing function.

The DPF 30 is a filter configured to collect particulate matter (PM) contained in the exhaust gas EG. As is well known, the DPF 30 comprises a honeycomb member composed of, for example, metal or ceramics. When a predetermined amount of PM is accumulated, the DPF 30 needs to use the burner 20 and the oxidation catalyst converter 25 with the adsorption function to increase the temperature of the PM up to at least the activation temperature thereof. This allows the collected PM to be combusted to recover the filter function. The temperature of the DPF 30 during the recovery process is, for example, between 600° C. and 700° C. Determining whether or not a predetermined amount of PM has been accumulated in the DPF 30 is performed according to a well-known technique and will thus not be described.

The selective catalytic reduction converter 40 uses a urea aqueous solution added via the urea addition valve 70 as a urea aqueous solution to selectively reduce NOx contained in the exhaust gas EG to nitrogen gas and water. Specifically, the urea aqueous solution added into the exhaust gas EG is hydrolyzed into ammonia by heat from the exhaust gas EG. The ammonia reacts with the NOx in the catalyst converter 40 and is thus reduced to water and harmless nitrogen. The selective catalytic reduction converter 40 has a well-known structure and is composed of, for example, zeolite containing Si, O, and Al as main components and Fe ions. Alternatively, the selective catalytic reduction converter 40 may comprise a base material composed of aluminum alumina oxide and on which a vanadium catalyst ($V_2O_5$) is carried. The selective catalytic reduction converter 40 is not particularly limited to these structures. The activation temperature of the selective catalytic reduction converter 40 at which the converter 40 functions as a catalyst is, for example, at least 200° C. NOx supplied to the selective catalytic reduction converter 40 before the activation temperature thereof is reached may be discharged to the exterior without being reduced.

The oxidation catalyst converter 50 serves to oxidize unburned fuel and ammonia passing through the selective catalytic reduction converter 40. The oxidation catalyst converter 50 has a well-known structure.

The ECU 100 comprises hardware including a CPU (Central Processing Unit), backup memories such as a ROM (Read Only Memory), a RAM (Random Access Memory), and an EEPROM (Electronically Erasable and Programmable Read Only Memory), an input interface circuit including an A/D converter and a buffer, and an output interface circuit including a driving circuit, as well as required software. The ECU 100 controls the burner 20, the urea aqueous solution addition valve 70, and the like based on, for example, signals from the exhaust temperature sensors 60A to 60D. Specific processing by the ECU 100 will be described below.

Figure 2:
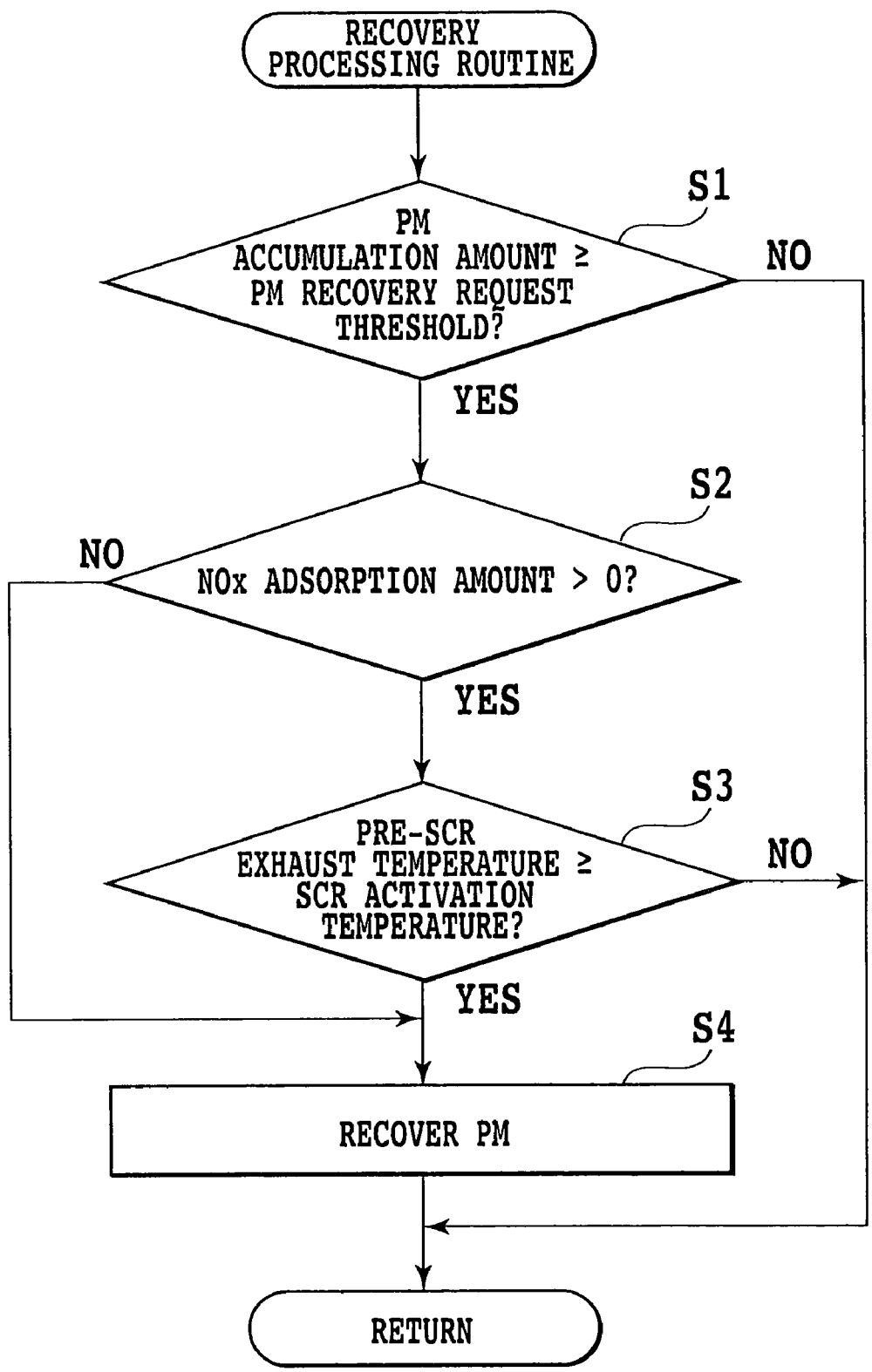
FIG. 2 is a flowchart showing an example of a recovery process executed on a DPF 30 by an ECU 100.

Now, an example of the procedure of the recovery process executed on the DPF 30 by the ECU 100 will be described with reference to FIG. 2. The recovery process routine shown in FIG. 2 is executed, for example, every predetermined time after the internal combustion engine has been started.

First, the routine determines whether or not the amount of PM accumulated in the DPF 30 exceeds a PM recovery request threshold for a PM recovery process to be executed (step S1). The amount of PM accumulated in the DPF 30 is calculated from, for example, the amount of fuel injected since the last PM recovery process. However, various well-known methods for estimating the amount of PM accumulated in the DPF 30 have been proposed. The PM recovery process threshold is determined based on, for example, the PM collecting capability of the DPF 30.

In step S2, if the current PM accumulation amount does not exceed the PM recovery request threshold, the process is terminated. If the current PM accumulation amount exceeds the PM recovery request threshold, the routine determines whether or not NOx has been adsorbed on the oxidation catalyst converter 25 with the adsorption function, that is, whether or not the amount of NOx adsorbed by the oxidation catalyst converter 25 with the adsorption function is larger than zero (step S2). Alternatively, in step S2, the routine determines whether or not the amount of NOx adsorbed by the oxidation catalyst converter 25 with the adsorption function is larger than a predetermined value.

If in step S2, the amount of NOx adsorbed by the oxidation catalyst converter 25 with the adsorption function is zero, the routine executes the PM recovery process on the DPF 30 described below (step S4).

If in step S2, the oxidation catalyst converter 25 with the adsorption function has adsorbed NOx, the routine determines whether or not the temperature (pre-SCR exhaust temperature) of exhaust gas present upstream of the selective catalytic reduction converter 40 has reached the activation temperature (SCR activation temperature) of the selective catalytic reduction (step 3). That is, the routine determines whether or not the catalyst in the selective catalytic reduction converter 40 has been activated. Whether or not the catalyst in the selective catalytic reduction converter 40 has been activated may be determined by a method other than the referencing of the pre-SCR exhaust temperature. The method has only to allow determination of whether or not the catalyst has been activated.

Upon determining in step S3 that the catalyst in the selective catalytic reduction converter 40 has been activated, the routine executes the PM recovery process on the DPF 30 (step S4). To execute the PM recovery process for the DPF 30, the burner 20 is ignited and started to increase the temperature of the exhaust gas EG. Then, the oxidation function of the oxidation catalyst converter 25 with the adsorption function is activated. As a result, the high-temperature exhaust gas EG flows into the DPF 30, the temperature of which rises. Thus, the PM accumulated in the DPF 30 is combusted to recover the DPF 30.

Here, in step S4, when the temperature of the oxidation catalyst converter 25 with the adsorption function is ignited and started to increase the temperature thereof, the NOx adsorbed on the oxidation catalyst converter 25 with the adsorption function desorbs as the temperature increases. The NOx then passes through the DPF 30 and reaches the selective catalytic reduction converter 40. At this time, the catalyst in the selective catalytic reduction converter 40, already been activated as determined in step S3, selectively reduces the NOx flowing in from the upstream side to convert the NOx into harmless nitrogen gas and water. That is, the oxidation catalyst converter 25 with the adsorption function is reliably activated before the execution of the PM recovery process for the DPF 30. As a result, the NOx desorbed from the oxidation catalyst converter 25 with the adsorption function is reliably purified by the selective catalytic reduction converter 40.

Upon determining in step S3 that the catalyst in the selective catalytic reduction converter 40 has not been activated, the routine terminates the processing. That is, the routine inhibits the PM recovery processing means from being started. This in turn inhibits the burner 20 from being started, preventing a possible increase in the temperature of the oxidation catalyst converter 25 with the adsorption function. Hence, the NOx adsorbed on the oxidation catalyst converter 25 with the adsorption function is prevented from flowing into the selective catalytic reduction converter 40 with the catalyst inactivated.

Figure 3:
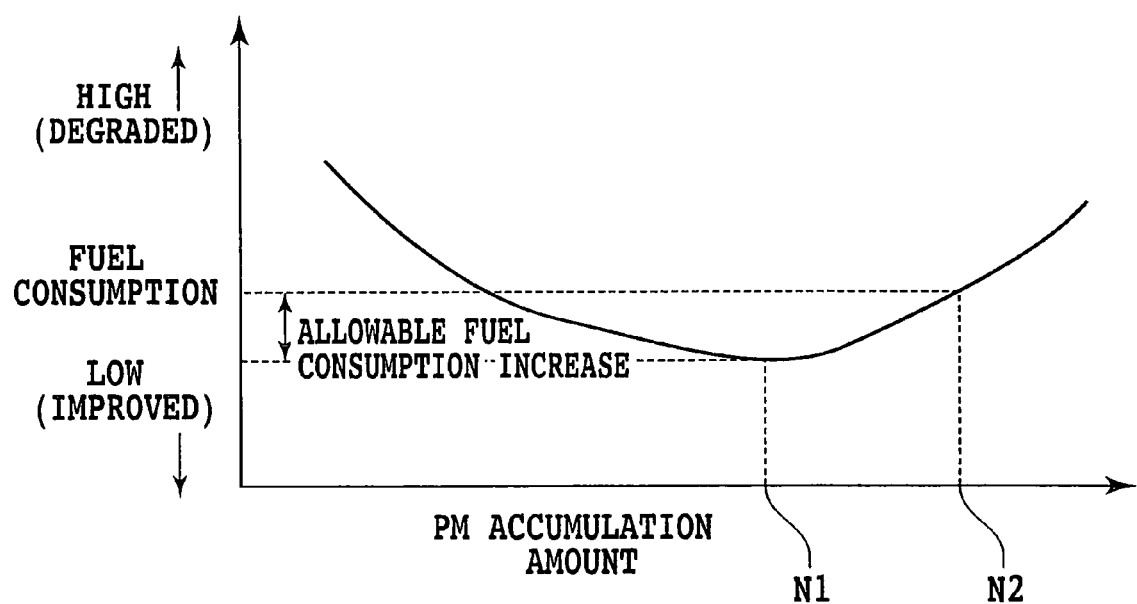
FIG. 3 is a diagram illustrating another example of the recovery process executed on the DPF 30 by the ECU 100.

FIG. 3 is a diagram illustrating another example of the recovery process executed on the DPF 30 by the ECU 100. In the above-described embodiment, the PM recovery process is executed at such a first PM recovery threshold (PM accumulation amount) N1 as corresponds to the best fuel consumption value, for example, as shown in FIG. 3. At the first PM recovery threshold N1, the PM accumulated in the DPF 30 can be combusted with the smallest amount of fuel.

As described with reference to FIG. 2, in step S3, if the catalyst in the selective catalytic reduction converter 40 has not been activated, the inhibition of the PM recovery process for the DPF 30 allows continuation of the state in which the PM recovery process is inhibited. Even while the PM recovery process remains inhibited, the amount of PM accumulated in the DPF 30 increases continuously above the first PM recovery threshold N1. As shown in FIG. 3, this increases the amount of fuel required for the PM recovery process (fuel supplied to the burner 20) when the PM recovery process is permitted, thus disadvantageously increasing the fuel consumption.

On the other hand, an increase in the amount of PM accumulated in the DPF 30 increases the quantity of heat generated to recover the PM. This allows the catalyst in the selective catalytic reduction converter 40, which is present downstream of the DPF 30, to be activated earlier. Hence, with the PM recovery process inhibited, a PM recovery threshold N2 shown in FIG. 3 is set based on the tradeoff between an increase in fuel consumption caused by an increase in PM accumulation amount and the earlier activation of the catalyst in the selective catalytic reduction converter 40 resulting from an increase in PM accumulation amount.

If the PM accumulation amount reaches the PM recovery threshold N2 while the PM recovery process remains inhibited, the inhibition of starting of the recovery process is canceled. Then, the PM recovery process is executed. This allows the catalyst in the selective catalytic reduction converter 40 to be activated earlier while minimizing an increase in fuel consumption.

In the configuration in the above-described embodiment, the oxidation catalyst converter 25 with the adsorption function provides both the function of an adsorption material and the function of an oxidation catalyst. However, the present invention is not limited to this aspect. An independent adsorption material configured to adsorb NOx may be located at any position downstream of the burner 20 and upstream of the selective catalytic reduction converter 40. Furthermore, the oxidation catalyst function and the adsorption material function may be separately provided. Moreover, the oxidation catalyst function may be omitted. In this case, the burner can be used to directly increase the temperature of the adsorption material.

In the above-described embodiment, the burner is used as recovery processing means. However, the present invention is not limited to this aspect. For example, instead of the burner, post injection of fuel for the internal combustion engine can be used to supply unburned fuel to the upstream oxidation catalyst to increase the temperature of the exhaust gas.

The invention claimed is:

1. An exhaust purification apparatus for an internal combustion engine including an exhaust passage, comprising:
   a filter provided in the exhaust passage in the internal combustion engine to collect particulate matter contained in exhaust gas;
   a selective catalytic reduction converter provided downstream of the filter in the exhaust passage to reduce nitrogen oxide contained in the exhaust gas;
   adsorption means provided upstream of the selective catalytic reduction converter in the exhaust passage to temporarily adsorb the nitrogen oxide contained in the exhaust gas and which is to be reduced by the selective catalytic reduction converter;

recovery processing means for recovering the filter by boosting temperature of the exhaust gas flowing into the filter, the selective catalytic reduction converter and the adsorption means so as to heat the filter over at least a predetermined recovery temperature; and an electronic control device including a routine, which when executed, inhibits the recovery processing means from being started if the selective catalytic reduction converter has not been activated even when the amount of particulate matter accumulated in the filter exceeds a predetermined value and thus the recovery processing means would otherwise be started.

2. The exhaust purification apparatus of claim 1, wherein the recovery processing means is provided upstream of the filter in the exhaust passage and comprises an oxidation catalyst converter configured to increase the temperature of the exhaust gas by oxidizing unburned fuel.

3. The exhaust purification apparatus of claim 2, wherein the recovery processing means includes a burner provided upstream of the oxidation catalyst converter in the exhaust passage.

4. The exhaust purification apparatus of claim 2, wherein the adsorption means is formed integrally with the oxidation catalyst converter.

5. The exhaust purification apparatus for the internal combustion engine according to claim 1, wherein the electronic control device determines whether or not to inhibit the recovery processing means from being started based on a condition of the selective catalytic reduction converter and an adsorption condition of the nitrogen oxide in the adsorption means.

6. The exhaust purification apparatus for the internal combustion engine according to claim 1, wherein while the recovery processing means is inhibited from being started, if the amount by which particulate matter is accumulated in the filter reaches a second predetermined amount exceeding the first predetermined amount, the inhibition of starting of the recovery process is cancelled.

7. A method for exhaust purification for an internal combustion engine including an exhaust passage, comprising:
    collecting particulate matter contained in exhaust gas with a filter provided in the exhaust passage in the internal combustion engine;
    reducing nitrogen oxide contained in the exhaust gas with a selective catalytic reduction converter provided downstream of the filter in the exhaust passage;
    adsorbing the nitrogen oxide contained in the exhaust gas and which is to be reduced by the selective catalytic reduction converter with an adsorption means provided upstream of the selective catalytic reduction converter in the exhaust passage;
    recovering the filter by boosting temperature of the exhaust gas flowing into the filter, the selective catalytic reduction converter, and the adsorption means so as to heat the filter over a predetermined recovery temperature; and
    inhibiting the recovery of the filter from being started if the selective catalytic reduction converter has not been activated even when the amount of particulate matter accumulated in the filter exceeds a predetermined value and thus the recovery of the filter would otherwise be started.

* * * * *